Jan. 30, 1940.  A. CLAUD-MANTLE  2,188,336
DASH-OPERATED LATCH AND SAFETY CATCH MECHANISM FOR LID TYPE AUTOMOBILE HOODS
Filed Feb. 3, 1939  2 Sheets-Sheet 1
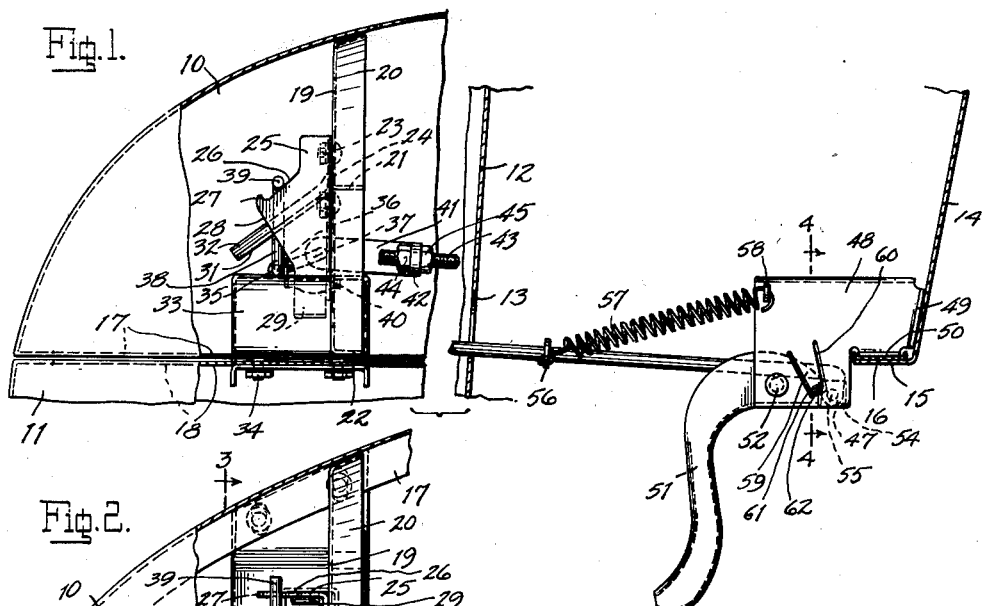
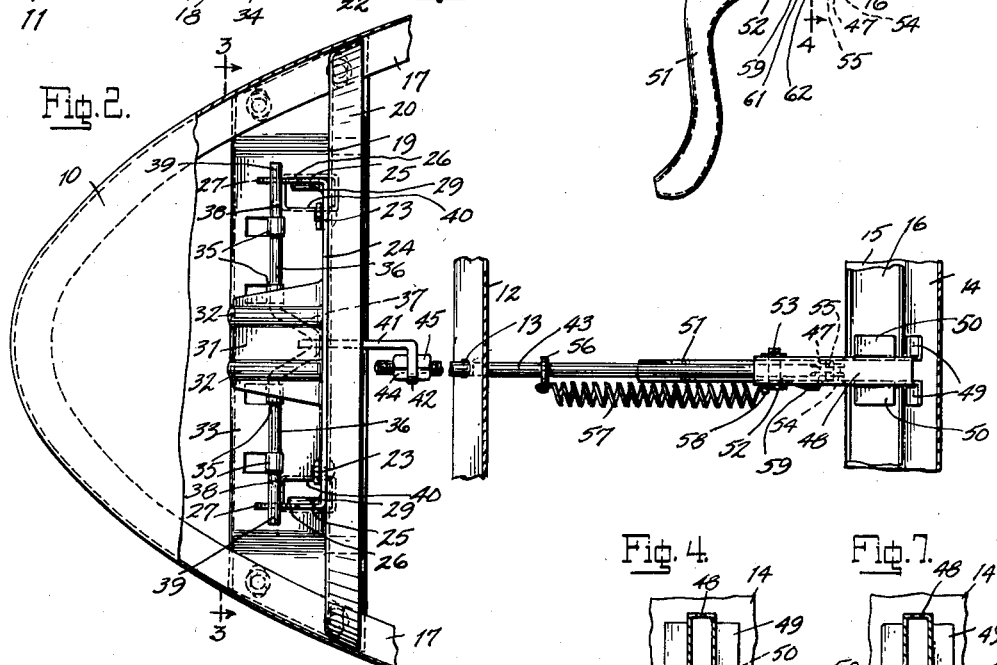
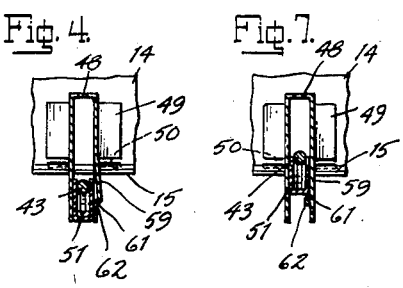
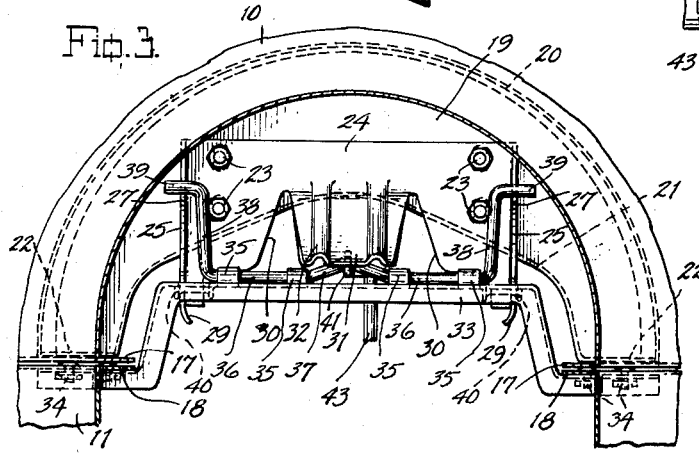
INVENTOR
ARTHUR CLAUD-MANTLE.
BY
ATTORNEY Jan. 30, 1940.  A. CLAUD-MANTLE  2,188,336
DASH-OPERATED LATCH AND SAFETY CATCH MECHANISM FOR LID TYPE AUTOMOBILE HOODS
Filed Feb. 3, 1939  2 Sheets-Sheet 2
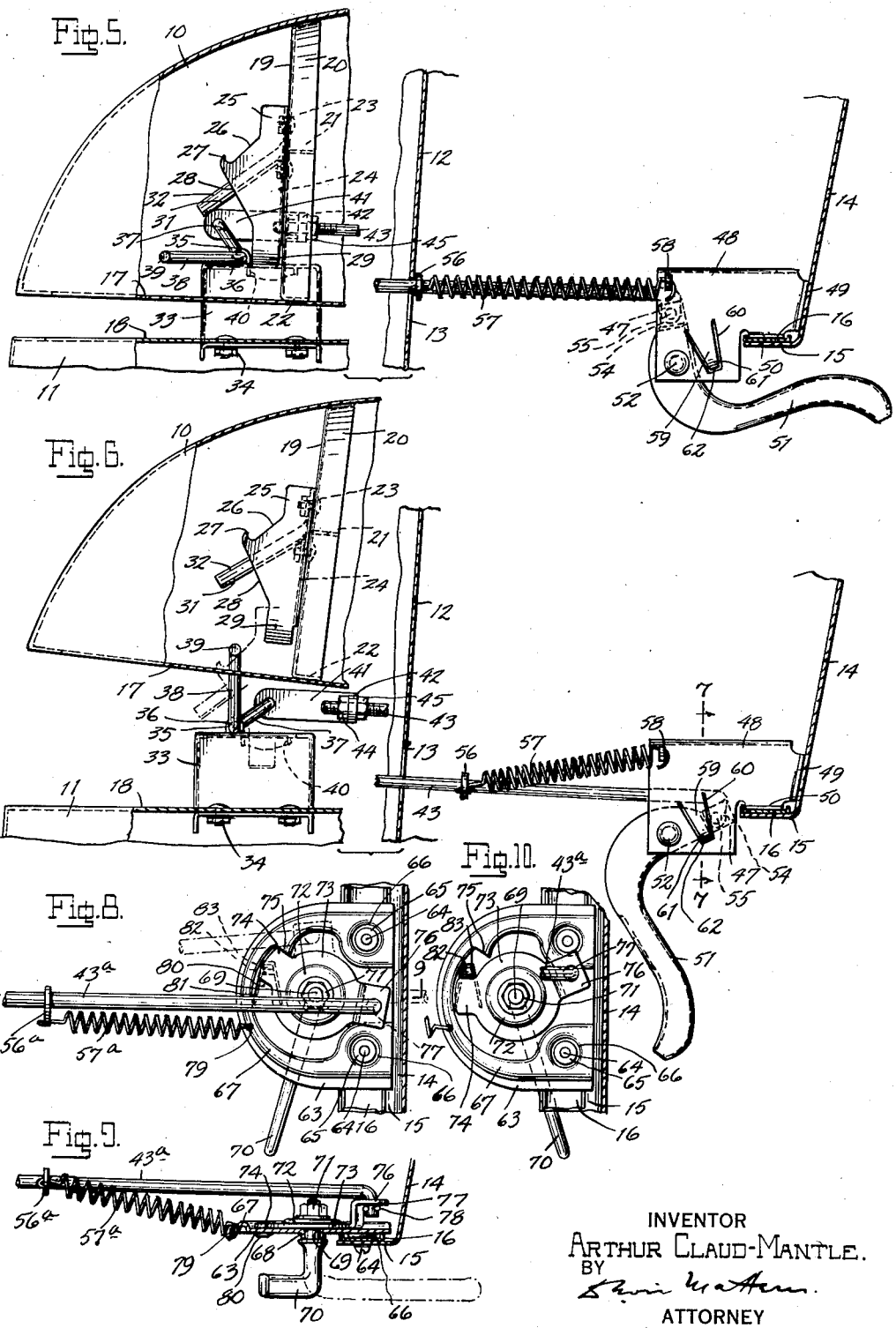
INVENTOR
ARTHUR CLAUD-MANTLE.
BY
ATTORNEY Patented Jan. 30, 1940

REISSUED
DEC 16 1941

2,188,336

UNITED STATES PATENT OFFICE 2,188,336

DASH-OPERATED LATCH AND SAFETY CATCH MECHANISM FOR LID TYPE AUTOMOBILE HOODS

Arthur Claud-Mantle, Trumbull, Conn., assignor to The Bassick Company, Bridgeport, Conn., a corporation of Connecticut Application February 3, 1939, Serial No. 254,392

7 Claims. (Cl. 292—214)

The present invention relates to an improvement in dash-operated latch and safety catch mechanism for lid type automobile hoods, particularly of the so-called alligator type which are hinged to the cowl at the rear of the engine compartment, the forward end of the hood adapted to swing upwardly in the open position. Hoods of this type are such that relative air currents produced during forward travel of the automobile exert forces which tend to open the hood, and it is an object of the present invention to provide latch mechanism having safety catch means whereby the closed hood is restrained from accidental opening, irrespective of whether the latch mechanism has been manually actuated to its normal latching position.

Another object is to provide a latch mechanism in which means is employed for automatically positioning the latch parts in the open position of the hood in such relation that such parts will automatically engage when the hood is closed, and will cause the safety catch means to become operative so that the hood cannot be accidentally raised without first manually actuating the latch mechanism.

A further object is to provide a latch mechanism in which the hook means for cooperating with the movable parts of the latch will function as centralizing means to insure the proper centralized engagement of the hood in its closed position.

A further object is to provide actuating means for the latch mechanism mounted interiorly of the automobile upon the dash so that it is only possible to actuate the latch parts to unlatching or latching position from the interior of the car. The hood is therefore protected against unauthorized opening, and when the automobile doors are locked the hood is in effect locked.

Another object is to provide a latch mechanism which upon being actuated from the inside of the automobile into unlatching position will automatically impart an initial raising movement to the hood, and will thereupon support the hood in such initially raised position, whereupon it may be conveniently raised from the outside of the automobile to full open position.

Another object is to provide a latch mechanism which will occupy a relatively small space where such mechanism will not interfere with the engine parts of the automobile, and further to provide mounting means for the latch parts which will form a structural reinforcing structure for the forward end of the engine compartment and hood.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a side elevation of the latch mechanism, the intermediate portion of the actuating rod being broken away, and the hood and dash structure being shown broken away and partially in vertical section, the mechanism in this illustration being shown in its operative latching position.

Fig. 2 is a plan view of the latch mechanism, the forward end of the engine compartment and hood being shown broken away and partially in horizontal section, and the dash and cowl structure being shown in horizontal section.

Fig. 3 is a vertical sectional view taken along the line 3—3 of Fig. 2, and showing the latch parts in front elevation.

Fig. 4 is a vertical sectional view taken along the line 4—4 of Fig. 1.

Fig. 5 is a view similar to Fig. 1, and showing the latch parts in the unlatched position with the hood initially raised and supported by the latching mechanism preparatory to being raised to full open position.

Fig. 6 is a view similar to Fig. 1, and showing the hood raised, the latch parts being shown in their moved position for automatic engagement upon closing of the hood, and the dot-and-dash lines showing the safety catch position which the latch assumes automatically upon closing of the hood.

Fig. 7 is a vertical sectional view taken along the line 7—7 of Fig. 6.

Fig. 8 is a plan view of a modified form of actuating means mounted upon the dash, the dot-and-dash lines showing the position of the parts when actuated to unlatch the hood.

Fig. 9 is a vertical sectional view taken along the line 9—9 of Fig. 8.

Fig. 10 is a plan view showing the parts in the safety catch position.

Similar reference characters indicate corresponding parts throughout the several figures of the drawings.

Referring to the drawings, the exemplary embodiment of the invention illustrated therein is adapted for incorporation in an automobile structure in which the hood 10 is hinged at its rearward end to the cowl at the rearward end of the engine compartment, the forward end of the hood adapted in the closed position to close upon the forward or radiator grill end 11 of the engine compartment. At the rearward end of the engine compartment there is provided an upright partition wall 12 which separates the engine compartment from the driver's compartment, and it is through a slot 13 in this wall that the actuating rod of the latch mechanism extends from the dash to the latching parts, as will presently more fully appear. The dash 14 is provided in the usual manner with an inwardly bent horizontal flange 15 at its lower edge having a stiffening channel strip 16 secured to its upper surface, and it is upon this flange that the actuating means for the latch mechanism is mounted, as will presently more fully appear. The hood 10 is provided at its edge with an inturned lateral flange 17, which in the closed position of the hood opposes an inturned lateral flange 18 provided upon the upper edge of the engine compartment.

A vertically disposed arch-shaped transverse beam member 19 is secured within the forward end of the hood, being provided at its outer periphery with a rearwardly bent flange 20 which conforms to the inner surface of the hood, and being provided along its arched inner periphery with a rearwardly extending reinforcing flange 21, the lower edges of the leg portions of the beam member being also provided with rearwardly extending flanges 22—22, continuously formed with the flanges 20 and 21, and which engage the lateral flange 17 of the hood. The beam member 19 is preferably secured within the hood by spot-welding, or if desired, may be secured by rivets or bolts, and in the secured position it forms a stiffening brace for the forward end of the hood.

Upon the forward side of the beam member 19 there is secured by means of bolts 23 a bracket member 24, provided at each of its ends with a forwardly bent hook and centralizing guide flange portion 25 provided along its upper edge with a downwardly and forwardly inclined cam surface 26, terminating at its forward end in an upwardly curved hook portion 27, the forward edge being curved downwardly from this hook portion 27 and being inclined downwardly and rearwardly, as at 28, to provide a guide surface for engagement with the movable parts of the mechanism during closing of the hood, this edge 27 terminating in an inwardly curved lead portion 29 adapted to guide the hood into centralized position, as will hereinafter more fully appear.

The central portion of the bracket member 24 is provided with two spaced inverted V-shaped notches 30—30 and the portion between these notches is bent forwardly at a downwardly inclined angle to provide a hood lifting camming portion 31 for cooperation with the latching mechanism, as will hereinafter more fully appear. This camming portion 31 is provided with a pair of stiffening ribs 32 pressed therein which render it relatively rigid with respect to the bracket member.

A horizontally disposed arched transverse channel beam 33 for carrying the latching parts extends between the side walls of the engine compartment and is secured at its downwardly offset ends to the side portions of the flange 18 by means of bolts 34. A series of axially aligned loop portions 35 is provided along the upwardly offset intermediate portion of the beam 33 near its forward edge, these loop portions being preferably lanced and bent from the metal of the beam. The torsion latching rod 36 has bearing in the bearing loop portions 35, and is provided at its central portion between the two spaced centrally disposed loop portions with a V-shaped crank portion 37. At each of its ends the rod 36 is provided with an upwardly extending leg portion 38 and an outwardly extending latching portion 39.

At each of the end areas of the beam 33 there is provided a rectangular downwardly flanged opening 40, and the outer flanged walls of these openings which are adapted to be engaged respectively by the inwardly curved lead portions 29 of the hook and centralizing flanges 25 are carried by the hood, as indicated in Figs. 1 to 3, these curved lead portions guiding the hood into centralized position as it is closed. It should be here pointed out that in the closed position of the hood the catch portions 39 of the torsion rod engage the inclined cam surface 26 of the flanges 25 under torsion set up by relative turning movement between the leg portions 38 and the crank portion 37 of the torsion rod.

An apertured bar 41 is connected to the crank portion 37 of the torsion rod, and is provided at its rearward end with a right angularly bent apertured portion 42 in which the forward threaded end of the actuating rod 43 is rigidly and adjustably secured by nuts 44 and 45 engaged upon the bar at each side of the portion 42. The forward rounded end of the bar 41 is disposed beneath the camming portion 31 and is adapted to engage and lift it during unlatching, as will hereinafter more fully appear. The actuating rod 43 extends in a generally horizontal direction rearwardly over the engine compartment through the slot 13 in the partition wall 12 and at its rearward end is provided with a flattened downwardly bent apertured bearing portion 47 which is connected, as will presently more fully appear, to the actuating handle lever.

An inverted U-shape bracket 48 is provided at its rearward edges with outwardly bent attaching ears 49 and along the rearward portion of its lower edges with outwardly bent attaching ears 50, these ears 49 and 50 being respectively attached to the inner surface of the dash 14 and to the upper surface of the channel bar 16 carried upon the inwardly bent flange 15, preferably by spot-welding. Forwardly of the actuating ears 50 the sides of the bracket 48 project downwardly and support the actuating handle lever 51 by means of a headed cross pin 52 secured in place by means of a cotter pin 53. The handle lever is of angular form with its handle portion normally projecting downwardly and is preferably bent from sheet metal, the upper portion engaged with the bracket 48 being of U-shape in cross-section and provided at its end with inwardly offset apertured spaced ears 54 between which the end bearing portion 47 of the rod 43 is connected by means of a cross pin 55.

A collar 56 is secured upon the rod 43 in forwardly spaced relation to the bracket 48 to which one end of a helical spring 57 is connected, the other end of this spring being connected to a lanced out lug 58 provided upon one side of the bracket 48, this spring adapted to exert rearward pull upon the rod 43, as will presently more fully appear.

In one side wall of the bracket 28 there is provided a resilient stop portion 59 formed by a divergent U-shaped cut 60 in said side wall, the lower end of this stop portion being provided with an inwardly bent inclined latching shoulder 61 and a lip 62 projecting downwardly from this shoulder.

The operation is as follows:

As shown in Figs. 1 to 3, the actuated handle lever 51 is in the over center latching position, that is, the axis of the pin 59 is below a line intersecting the axis of the pin 52 and the axis of the connection of the bar 41 with the crank portion 37 of the torsion rod, the latching portions 39 being engaged with the inclined cam surface 26 of the retaining hook portions 25, and the torsion rod being under torsion set up by relative turning of the crank portion 37 in clockwise direction with respect to the leg portions 38, the tension set up by the torsioned rod exerting a forward pull upon the rod 43 which maintains the over-center position of the handle lever 51, this position being limited by engagement of the rod 43 with the cross-pin 52.

In order to release the catch the handle lever 51 is pulled in counter-clockwise direction by the occupant of the automobile seated in the driving seat, overcoming the torsion of the torsion rod to the point where the pin 59 swings upwardly past the dead center, whereupon the rotation of the handle lever 51 is continued against the force of the spring 57 causing the leg portions 38 and the latching portions 39 of the torsion rod to swing in counter-clockwise direction out of contact with the camming surface 26 and clear of the hook portions 27. During this movement the rounded forward end of the bar 41 engages the under-surface of the cam portion 31 and causes the hood to be raised simultaneously with the unlatching movement, the hood and latching parts thereupon assuming the position shown in Fig. 5. During this action the spring 57 is being tensioned and the hood lifted by manual force applied to the handle lever 51, but as soon as the crank portion 37 moves forwardly of the dead center with respect to the weight of the hood imposed thereon, this weight rotates the torsion rod to the supporting position shown in Fig. 5. With the leg portions 38 engaging the upper surface of the beam 33. In this position the weight of the hood, exerting a force on the torsion rod in counter-clockwise direction, is sufficient to overcome the rearward pulling force of the tensioned spring 57, and the parts remain in this position until the hood is manually raised, the preliminary raising of the hood, as shown in Fig. 5, providing sufficient clearance between the hood and the upper surface of the engine compartment to enable the fingers to be inserted beneath the hood to raise it.

As soon as the hood is raised and its weight lifted from the torsion rod the tensioned spring 57 moves the latching parts to the position shown in Fig. 6, the lever handle 51 being rotated in clockwise direction into engagement with the shoulder 61 of the resilient stop portion 59, as shown in Figs. 6 and 7, this position being just short of the dead center position. In this relation of the latching parts the latching portions 39 of the torsion rod are in the path of the cam surface 28 of the hook flanges 25, so that as the hood is closed the latching portions are caused to ride about the hook ends 27 and swing into engagement with the cam surfaces 26 under the tension of the spring 57, as shown by the dot-and-dash lines, Fig. 6. This is the safety catch position in which the latching parts will remain in contact under the tension of the spring 57, so that if the hood tends to raise through the force of air currents imposed thereon it will be prevented from opening through engagement of the latching portions 39 with the hook portions 27, thus insuring against accidental raising of the hood in the event that the operator of the automobile neglects to actuate the mechanism to full latching position. The mechanism is actuated to full latching position by pushing the lever handle 51 forwardly from the position shown in Fig. 6 to the position shown in Fig. 1, this movement causing the torsion rod to be torsioned and swinging the handle lever to the over center position where it is maintained by the forward pull exerted upon the rod 43 by the torsioned torsion rod. During this movement the resilient stop portion 59 is forced outwardly to the position shown in Fig. 4 where its lip end portion 62 presses against the side surface of the handle lever 51, this action being facilitated by the camming engagement of the rounded corner of the handle lever with the inclined shoulder 61.

In Figs. 8 to 10 I have illustrated a modified form of actuating mechanism, in which the actuating handle moves about a vertical axis, as distinguished from the horizontal axis of the lever handle in the first embodiment. A horizontally disposed plate 63 is secured to the flange 15 of the dash 14 by means of screws 64 engaging clinch nuts 65, secured in recessed portions 66 provided in each side of an embossed rib formation 67 provided in the plate. This rib formation 67 surrounds a central depressed area of generally circular shape, and centrally of this area there is provided a downwardly flanged bearing aperture 68 in which the vertically disposed shouldered shank 69 of the horizontal actuating handle 70 is engaged, the upper end of this shank being threaded and rigidly secured by means of a nut 71 to the central upwardly embossed apertured portion 72 of a lever member 73.

This lever member is provided at one end with a radially projecting stop portion 74, which in the normal latching position abuts a stop lug 75 formed upon the plate 63, and is provided at its opposite side with an outwardly offset apertured rod attaching portion 76, to which the bent end 77 of the actuating rod 43ᵃ is secured, this end being inserted through the aperture and retained by swedging lugs 78 upon said bent end beneath the portion 76.

A spring 57ᵃ is secured between a collar 56ᵃ secured upon the rod 43ᵃ and the plate, the end of this spring being engaged in a hole 79 formed near the edge of the plate.

A resilient stop portion 80 is provided in the plate by means of a divergent U-shaped cut 81, and is provided at its end with an inclined stop shoulder 82 and an end lip portion 83, the lip portion adapted to engage the under-surface of the end portion 74 of the lever 73 in the latching position, as shown in Fig. 8, and the inclined stop shoulder 82 adapted to engage one edge of the extension 74 in the safety catch position, as shown in Fig. 10, and in which position it is maintained under the pull of the spring 57ᵃ.

The operation of this actuating mechanism is substantially similar to that of the first embodiment, the end 77 of the actuating rod 43ᵃ being in the over-center position shown in full lines in Fig. 8, in the latching position, where it is maintained by the pull of the torsion rod, and being movable in counter-clockwise direction to the dot-and-dash line position shown in Fig. 8 to actuate the mechanism to unlatching position, the parts being automatically moved to the safety catch position shown in Fig. 10 under the force of the spring 57ᵃ when the hood is raised. In order to actuate the mechanism to latching position, when the hood is closed and the parts engaged in the safety catch position, the handle 70 is pushed forwardly from the safety catch position shown in Fig. 10 to the latching position shown in Fig. 8.

I have illustrated and described preferred and satisfactory embodiments of my invention, but it will be understood that changes may be made therein, within the spirit and scope thereof as defined in the appended claims.

Having thus described my invention what I claim and desire to secure by Letters Patent is:

1. In a latching mechanism for releasably securing a lid type automobile hood or the like to an engine compartment member or the like, in which a fixed latching part is carried by said hood member and includes a latching surface and a lifting surface, movable latching means adapted to be carried by said engine compartment member for cooperation with said fixed latching part, said latching means comprising a support, a latching member movably mounted upon said support and movable between latching and unlatching positions to engage and disengage said latching surface, manually operable actuating means for said latching member comprising a bracket member adapted to be mounted upon the dash interiorly of the automobile, a manually operable lever member pivotally mounted upon said bracket member, a pull rod pivotally connected at one end to said latching member and at its other end to said lever member, said lever member and pull rod adapted to be actuated between the full latching and unlatching positions to impart latching and unlatching movement to said latching member, and lifting means movable with said pull rod adapted during unlatching movement to engage said lifting surface to raise the hood, the weight of the hood adapted to retain said latching member in unlatching position until said weight is lifted by further manual raising of the hood.

2. In a latching mechanism for releasably securing a lid type automobile hood or the like to an engine compartment member or the like, in which a fixed latching part is carried by said hood member and includes a latching surface and an inclined camming lifting surface, movable latching means adapted to be carried by said engine compartment member for cooperation with said fixed latching part, said latching means comprising a support, a latching member movably mounted upon said support and movable between latching and unlatching positions to engage and disengage said latching surface, manually operable actuating means for said latching member comprising a bracket member adapted to be mounted upon the dash interiorly of the automobile, a manually operable lever member pivotally mounted upon said bracket member, a pull rod pivotally connected at one end to said latching member and at its other end to said lever member, said lever member and pull rod adapted to be actuated between the full latching and unlatching positions to impart latching and unlatching movement to said latching member, and lifting means movable with said pull rod adapted during unlatching movement to engage said lifting surface to raise the hood, the weight of the hood adapted to retain said latching member in unlatching position until said weight is lifted by further manual raising of the hood.

3. In a latching mechanism for releasably securing a lid type automobile hood or the like to an engine compartment member or the like, in which a fixed latching part is carried by said hood member and includes a latching surface and a lifting surface, movable latching means adapted to be carried by said engine compartment member for cooperation with said fixed latching part, said latching means comprising a support, a latching member movably mounted upon said support and movable between latching and unlatching positions to engage and disengage said latching surface, manually operable actuating means for said latching member comprising a bracket member adapted to be mounted upon the dash interiorly of the automobile, a manually operable lever member pivotally mounted upon said bracket member, a pull rod pivotally connected at one end to said latching member and at its other end to said lever member, said lever member and pull rod adapted to be actuated between the full latching and unlatching positions to impart latching and unlatching movement to said latching member, and lifting means movable with said pull rod adapted during unlatching movement to engage said lifting surface to raise the hood, the weight of the hood adapted to retain said latching member in unlatching position until said weight is lifted by further manual raising of the hood, and spring means arranged to exert pressure on said actuating means toward its latching position.

4. In a latching mechanism for releasably securing a lid type automobile hood or the like to an engine compartment member or the like, in which a fixed latching part is carried by said hood member and includes a latching surface and an inclined camming lifting surface, movable latching means adapted to be carried by said engine compartment member for cooperation with said fixed latching part, said latching means comprising a support, a latching member movably mounted upon said support for rotation about a horizontal axis and movable between latching and unlatching positions to engage and disengage said latching surface, manually operable actuating means for said latching member comprising a bracket member adapted to be mounted upon the dash interiorly of the automobile, a manually operable lever member pivotally mounted upon said bracket member, a pull rod pivotally connected at one end to said latching member and at its other end to said handle lever, said lever member and pull rod adapted to be actuated between the full latching and unlatching positions to impart latching and unlatching movement to said latching member, and lifting means movable with said pull rod adapted upon during unlatching movement to move in a rising arc in one direction to engage said lifting surface to raise the hood, the weight of the hood adapted to move said lifting means in a descending arc in said one direction to retain said latching member in unlatching position until said weight is lifted by further manual movement of the hood.

5. In a latching mechanism for releasably securing a lid type automobile hood member or the like to an engine compartment member or the like, a fixed latching part adapted to be carried by said hood member including a latching surface and a safety hook at one end of said latching surface, and movable latching means adapted to be carried by said engine compartment member for cooperation with said fixed latching part, said latching means comprising a support, a latching member movably mounted upon said support and movable between latching and unlatching positions to engage and disengage said latching surface, manually operable actuating means for said latching member comprising a bracket member adapted to be mounted upon the dash interiorly of the automobile, a manually operable lever member pivotally mounted upon said bracket member, a pull rod pivotally connected at one end to said latching member and at its other end to said lever member, said lever member and pull rod adapted to be actuated between full latching and unlatching positions to impart latching and unlatching movement to said latching member, and spring means arranged to exert pressure on said actuating means to move it toward its latching position.

6. In a latching mechanism for releasably securing a lid type automobile hood member or the like to an engine compartment member or the like, a fixed latching part adapted to be carried by said hood member including an upwardly facing latching surface, a safety hook at one end of said latching surface, and an inclined guide surface extending downwardly from said safety hook, and movable latching means adapted to be carried by said engine compartment member for cooperation with said fixed latching part, said latching means comprising a support, a latching member movably mounted upon said support and movable between latching and unlatching positions to engage and disengage said latching surface, manually operable actuating means for said latching member comprising a bracket member adapted to be mounted upon the dash interiorly of the automobile, a manually operable lever member pivotally mounted upon said bracket member, a pull rod pivotally connected at one end to said latching member and at its other end to said lever member, said lever member and pull rod adapted to be actuated between full latching and unlatching positions to impart latching and unlatching movement to said latching member, and spring means arranged to exert pressure on said actuating means to move it toward its latching position and to position it in the path of said guide surface.

7. In a latching mechanism for releasably securing a lid type automobile hood member or the like to an engine compartment member or the like, a fixed latching part adapted to be carried by said hood member, and movable latching means adapted to be carried by said engine compartment member for cooperation with said fixed latching part, said latching means comprising a support, a latching member movably mounted upon said support and movable between latching and unlatching positions, manualy operable actuating means for said latching member comprising a bracket member, a manually operable lever member pivotally mounted upon said bracket member, a pull rod pivotally connected at one end to said latching member and at its other end to said lever member, said lever member and pull rod adapted to be actuated between full latching and unlatching positions to impart latching and unlatching movement to said latching member, resilient stop means adapted to restrain the movement of said actuating means toward its latching position at a predetermined point short of its full latching position, and spring means arranged to exert pressure on said actuating means to move it toward its latching position into engagement with said resilient stop means.

ARTHUR CLAUD-MANTLE.